(12) United States Patent
Schleede et al.

(10) Patent No.: US 10,868,930 B2
(45) Date of Patent: Dec. 15, 2020

(54) LANGUAGE SELECTION FOR USER INTERFACE

(71) Applicant: Xerox Corporation, Norwalk, CT (US)

(72) Inventors: Kenneth B. Schleede, Webster, NY (US); Peter Granby, Hertfordshire (GB); Rajana Mukesh Panchani, London (GB); Mirelsa Fontanes-Pérez, Webster, NY (US)

(73) Assignee: XEROX CORPORATION, Norwalk, CT (US)

( * ) Notice: Subject to any disclaimer, the term of this patent is extended or adjusted under 35 U.S.C. 154(b) by 0 days.

(21) Appl. No.: 16/411,358

(22) Filed: May 14, 2019

(65) Prior Publication Data
US 2020/0366803 A1    Nov. 19, 2020

(51) Int. Cl.
*H04N 1/00* (2006.01)
*G06F 3/0482* (2013.01)
*G06F 3/0488* (2013.01)

(52) U.S. Cl.
CPC ....... *H04N 1/00498* (2013.01); *G06F 3/0482* (2013.01); *G06F 3/04883* (2013.01); *H04N 1/00411* (2013.01); *H04N 1/00437* (2013.01); *H04N 1/00511* (2013.01)

(58) Field of Classification Search
CPC ........... H04N 1/00498; H04N 1/00411; H04N 1/00437; H04N 1/00511; G06F 3/0482; G06F 3/04883
See application file for complete search history.

(56) References Cited

U.S. PATENT DOCUMENTS

| | | | |
|---|---|---|---|
| 10,078,630 B1* | 9/2018 | Gupta | G06F 40/58 |
| 2012/0079376 A1* | 3/2012 | Grellmann | G06F 3/04817 |
| | | | 715/703 |
| 2015/0161227 A1* | 6/2015 | Buryak | G06F 9/454 |
| | | | 707/738 |
| 2015/0261481 A1* | 9/2015 | Takenaka | G06F 3/1285 |
| | | | 358/1.15 |
| 2017/0279990 A1 | 9/2017 | Xu | |
| 2019/0297206 A1* | 9/2019 | Koike | G06F 3/1285 |

OTHER PUBLICATIONS

Changing Languages, Xerox Corporation Customer Support Forum, 2018, pp. 1-3.
Altalink, Xerox Corporation Support, 2017, pp. 1-13.

* cited by examiner

*Primary Examiner* — Helen Zong
(74) *Attorney, Agent, or Firm* — Fay Sharpe LLP (57) ABSTRACT

A method provides for language selection on a shared local user interface, such as an interface for operating a printer that is used by multiple users having a variety of first languages. The method includes providing at least one mechanism on a shared local user interface for selection of one of an original set of languages for text to be displayed on the local user interface. One mechanism may include displaying text in each of the languages contemporaneously or sequentially. At a plurality of times, a respective user's selection of one of the original set of languages is received. Based on a plurality of user selections, a modified set of languages can be learned which is then used in place of the original set of languages when providing the at least one language selection mechanism at a subsequent time.

20 Claims, 7 Drawing Sheets

LANGUAGE SELECTION FOR USER INTERFACE

BACKGROUND

The exemplary embodiment relates to devices, such as printers, which make use of a local user interface for displaying selections to the user in a natural language which is tailored to a specific user or a group of users.

Local user interfaces allow users to interact with devices in a natural language. The language is usually set during initial set up of the device. Users who are not familiar with the selected language may have difficulty navigating through the various options for operating the device which are displayed on the screen. While an administrator may have the ability to change the language to suit the users of a device, this generally entails navigating through the menu in the current language and does not allow for switching between languages to suit particular users. Some devices may permit users to select an operating language, but due to the large number of possible languages, would be time consuming for users to make their selection. Additionally, once the language is changed, this may be inconvenient for other users.

There remains a need for a LUI which is able to switch between languages to suit users that are unfamiliar with the default language of the device.

INCORPORATION BY REFERENCE

The following references, the disclosures of which are incorporated herein in their entireties by reference, are mentioned:

U.S. Pub. No. 20120079376, published Mar. 29, 2012, entitled SYSTEM AND METHOD FOR CONTROL PANEL TEXT OVERLAY ELIMINATION USING DISPLAY ICONS WITH LANGUAGE TAGS, by Grellmann, et al., describes a device including a screen and a control panel with push buttons and respective icons for the push buttons. A processor displays the icons on the screen and, for each icon a description, in a first language, of a respective function, represented by said each respective icon, implementable by the device. The language can be selected from several available languages.

U.S. Pub. No. 20170279990, published Sep. 28, 2017, entitled PREFERRED LANGUAGE OF A USER INTERFACE, by Xu, describes including a language parameter associated with a preferred language in a job request, different from an original language, and displaying at least a portion of a user interface in the preferred language.

BRIEF DESCRIPTION

In accordance with one aspect of the exemplary embodiment, a method for language selection on a shared local user interface, includes providing at least one mechanism on a shared local user interface for selection of one of an original set of languages for text to be displayed on the local user interface. At a plurality of times, a respective user's selection of one of the original set of languages is received. Based on a plurality of the user selections, a modified set of languages to be used in place of the original set of languages during providing the at least one mechanism at a subsequent time is learnt.

One or more of the steps of the method may be performed with a processor.

In accordance with another aspect of the exemplary embodiment, a shared local user interface includes memory storing instructions which: provide at least one mechanism on the shared local user interface for selection of one of an original set of languages for text to be displayed on the local user interface, at a plurality of times, receive a user's selection of one of the original set of languages and, based on a plurality of the users selections, learn a modified set of languages to be used in place of the original set of languages during providing the at least one mechanism at a subsequent time. A processor executes the instructions.

In accordance with another aspect of the exemplary embodiment, a method for language selection on a shared local user interface includes providing at least one mechanism on a shared local user interface for selection of one of an original set of languages for text to be displayed on the local user interface, the at least one mechanism comprising automatically displaying text in each of the languages in the set in a sequence on the local user interface and providing for a user to select a currently displayed one of the languages. A user's selection of one of the original set of languages is received and text is displayed on the LUI in the selected language.

One or more of the steps of the method may be performed with a processor.

DETAILED DESCRIPTION

Figure 1:
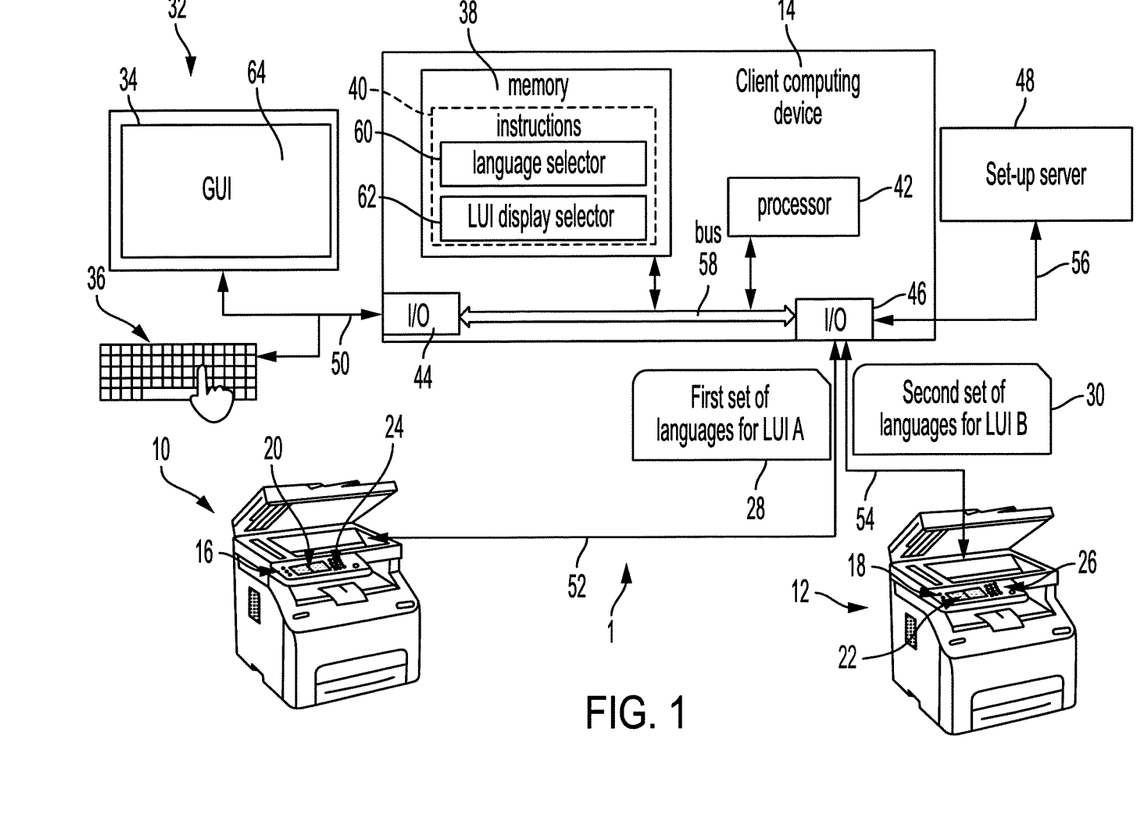
FIG. 1 is a functional block diagram of an environment in which a language selection system operates, in accordance with one aspect of the exemplary embodiment.

With reference to FIG. 1, a language selection system 1 includes a set of shared devices 10, 12, such as multifunction printers, and a language set selection device, such as the illustrated client computing device 14. As will be appreciated, while two devices 10, 12 are illustrated, any number of devices may be linked to a common language set selection device 14, or the language selection device may be incorporated into each device 10, 12.

Each shared device 10, 12, performs jobs, such as print, copy, and/or fax jobs, in the case of a multifunction printer. Each print (copy, fax) job may include printing (copying, faxing) one or more pages of an electronic or hardcopy document.

The shared devices 10, 12 each include or are associated with a respective local user interface (LUI) 16, 18. Each LUI is operable by users of the devices to control at least some of the operations of the device and/or display information about the device, such as error messages. The multiple users of a given one of the devices 10, 12 may have different first natural languages, such as English, French, German, and the like, and would each generally prefer to operate the LUI 16, 18 using commands, as well as having other information displayed, in their own respective first language. Since the users of a given device may change over time, it would be desirable for each LUI 16, 18 to adapt to the current users' language preferences. Similarly, the users of one shared device 10 may differ from users of another shared device 12 in their collective language preferences.

Each LUI includes a display device 20, 22, such as an LCD screen, and a user input device 24, 26, such as a touch or writable screen, keypad, buttons, cursor control device, such as mouse, trackball, or the like, combination thereof, or the like. Each LUI 16, 14 is local to the device it controls, e.g., incorporated into a housing for the device or within a few meters of the device so that a user can view and operate the device and LUI at the same time.

Each LUI 16, 18 is preprogrammed to be able to display information to users in a plurality of different languages. In one embodiment, an original set 28, 30 of at least two languages is selected on the client computing device 14 for each LUI 16, 18, during set up of the respective device 10,12. For example an administrator may select a first (original) set 28 of languages from a larger, set of supported languages available for use on the devices for a first LUI 16 and second (original) set 30 of languages from the larger set of supported languages available for use on the devices for a second LUI 18. The second set 30 may be the same as, or differ from, the first set 28. For example, the supported set of languages may include at least ten or at least twenty languages (which may include country-specific versions of languages, such as English-US and English-UK). The original set(s) 28, 30 may each include at least two or at least three of the same supported set of languages, such as up to five or up to three languages. The original sets 28, 30 may include the same number or different numbers of languages.

The administrator may use the client computing device 14 to select the languages to form the original set(s), e.g., via a main user interface 32 incorporating a display device 34 and a user input device 36, such as a keyboard, keypad, touch or writable screen, combination thereof, or the like. The administrator may also select a priority for one or more of the languages in the original set. The selected priority may be used to set a default language for the user interface and/or may be used to prioritize how alternative languages in the original set are presented to users of the LUI. Alternatively, or additionally, the original set(s) 28, 30 of languages and/or their priorities may be established via the respective device LUIs 16, 18. In one embodiment, the administrator may access and control the LUI remotely.

As used herein, an "administrator" can be any authorized person having permissions to implement the functions of an administrator described herein. These administrative functions may be accessed by logging in with a set of credentials. Other users of the devices (called "users" herein) generally do not have such permissions.

The language selection feature described herein may be enabled by the administrator via a tools pathway on the LUI 16, 18, or remotely, via the client computing device 14.

The illustrated client device 14 includes memory 38 storing instructions 40 and a processor 42, in communication with the memory, for executing the instructions. The client computing device 14 may further include one or more input/output (I/O) devices 44, 46, for communication with external devices, such as user interface 32, one or more LUIs 14, 16, and optionally with a set-up server 48, through wired and/or wireless links 50, 52, 54, 56. Hardware components 38, 42, 44, 46 of the client device 14 may communicate via a data/control bus 58.

Figure 2:
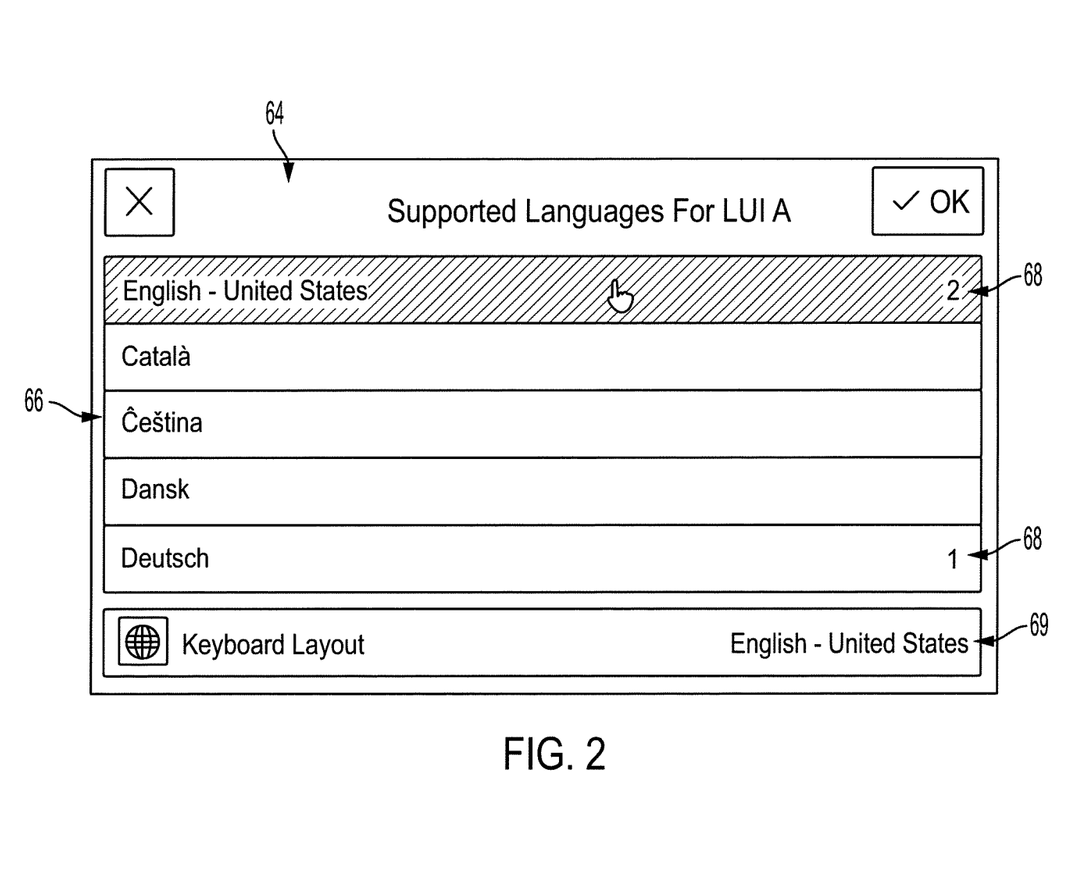
FIG. 2 illustrates a screenshot of a language selection interface, in accordance with one aspect of the exemplary embodiment.

The instructions 40 may be downloaded from the set-up server 48 and/or accessed on the server 48 by a thin client on the client computing device 14. The illustrated instructions 40 include an original language selector 60 and an LUI display selector 62. The language selector 60 implements a graphical user interface (GUI) 64, via the user interface 32, which provides the administrator with a mechanism for selecting the original set(s) 28, 30 of languages. For example, FIG. 2 illustrates a GUI 64 which displays a scrollable menu 66 of supported languages from which the administrator can select the set of languages 28 for a given LUI 14 and assign the languages a respective priority and/or sequence order 68. In the illustrated GUI 64, the administrator has selected English-United States and German (Deutsch) as the original set of languages for LUI 14 and has assigned German as the highest priority language. A different set 30 of languages and their priorities may be selected for other LUIs 16 controlled by the administrator. The language priority 68 controls the prominence and/or order of the languages for the respective LUI 16, 18, when the set 28, 30 includes more than one language. A highest priority language may be used as a default language to which the LUI automatically returns, absent a user selection of another language. The highest priority language may be used to identify the layout of the keyboard 24, when different keyboard layouts are available on the LUI. Alternatively, the administrator may be permitted to select a keyboard layout independently of the language priorities, as shown at 69.

Figure 3:
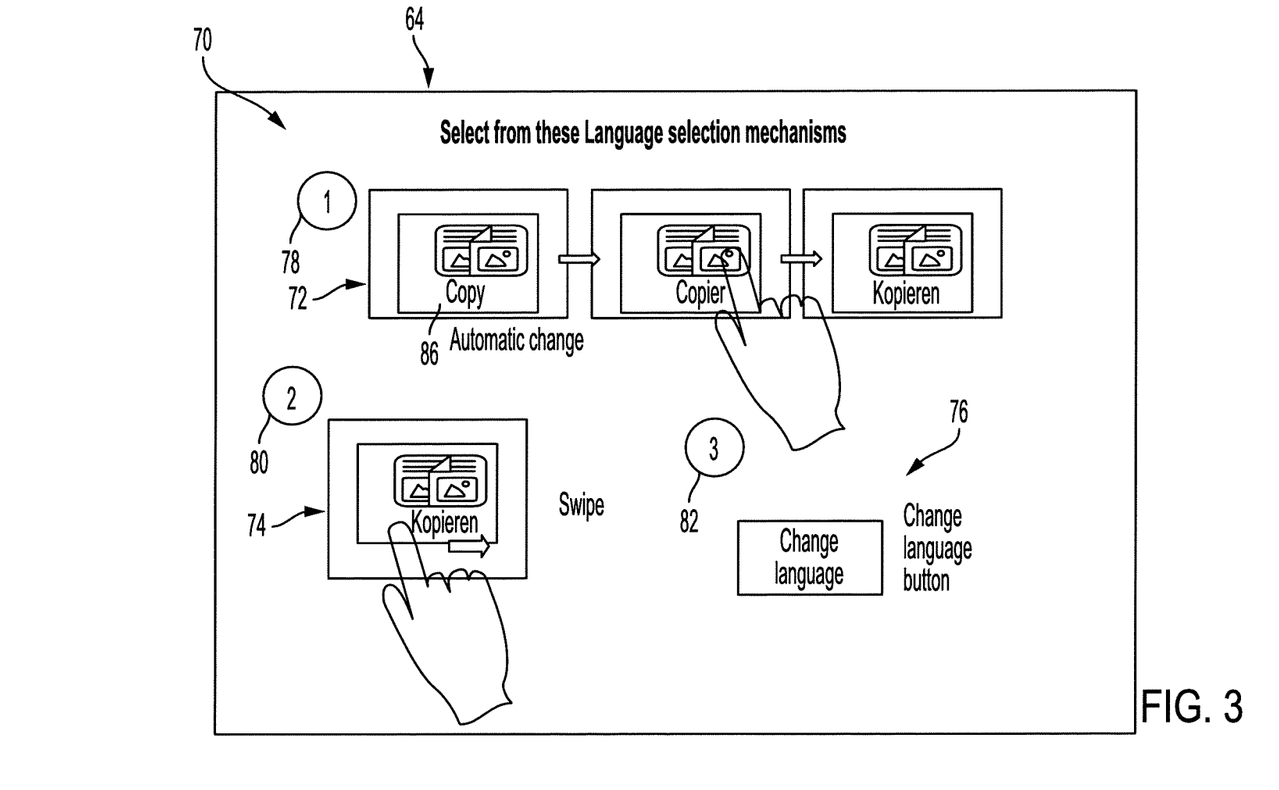
FIG. 3 illustrates a screenshot of a main user interface for selection of language selection mechanisms, in accordance with one aspect of the exemplary embodiment.
Figure 4:
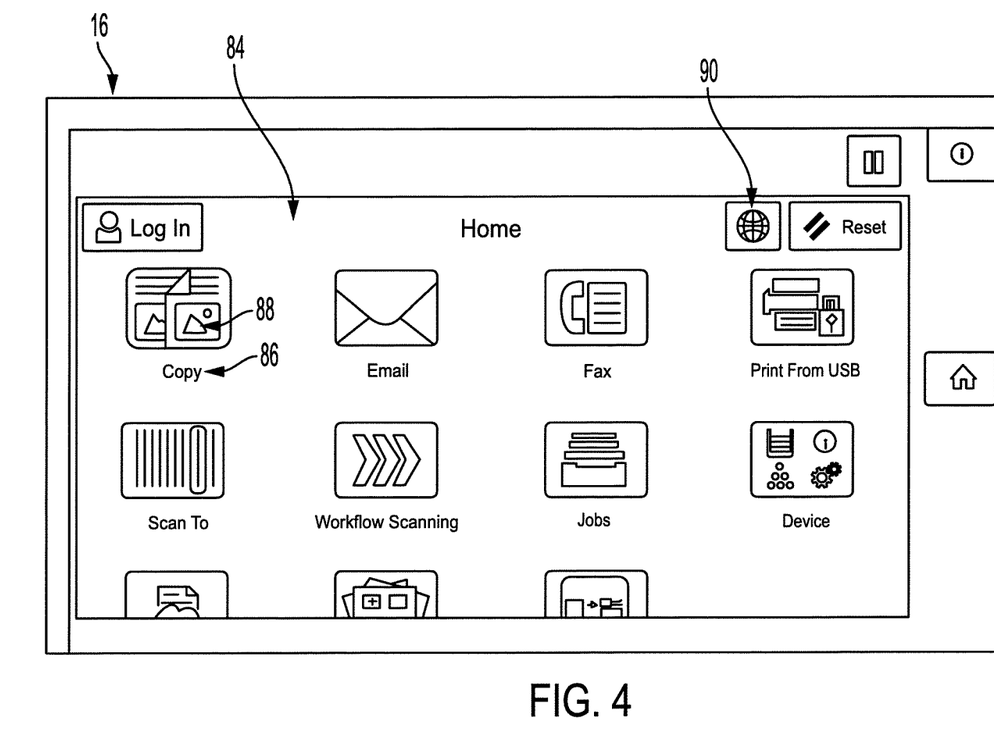
FIG. 4 illustrates a screenshot of a device local user interface, in accordance with one aspect of the exemplary embodiment.

The optional LUI display selector 62 allows the administrator to select, e.g., via the GUI 64, how a user of the device 10 will be able to choose a language for the display that is other than the highest priority language in the set of languages. For example, FIG. 3 illustrates a menu 70 providing a choice of three methods for language selection, illustrated at 72, 74, and 76, respectively. In a first method, which is selectable through selectable region 78, text in a current screen changes between languages, e.g., changes from one language to another, every few seconds. When this option is selected for implementing on an LUI, a user of the LUI 16, 18 is able to select one of the set of languages by clicking on an actuable button while associated text is being displayed in a given one of the languages. For example, when a home menu 80 (FIG. 4) is displayed on the LUI display 16, text 86 such as the word "Copy", for a corresponding copy button 88 changes from one of the languages in the set of languages to another at intervals, e.g., sequentially displaying "Copy", "Copier", and "Kopieren", corresponding to the English, French, and German word for the "Copy" function, as illustrated in FIG. 3. If a user actuates the copy button 88 on the LUI when the English text is being displayed, the copy menu is then displayed in English, displaying for example, text for selecting between single-sided and double-sided copying, number of copies, etc., in English only. Similarly, if the user clicks on the copy button 88 while the associated text "Kopieren" is displayed, then the copy menu is then displayed only in German. As will be appreciated, text associated with other user-selectable functions, such as faxing, scanning, printing, etc., may similarly change from one language to another allowing multiple ways for user selection of a language for further interactions with the device.

In some embodiments, rather than displaying text sequentially in the languages of the set 28, 30, text may be displayed in two or more of the languages in the set concurrently. A user selects one of the languages by touching or otherwise actuating a part of the screen displaying text in that language.

As an example, the administrator selects the top three languages, e.g., English, French and German, for a Swiss customer. The three languages are shown in a transitional style on the LUI all the time. For example, the 'Copy' icon shows that word in all three languages and transitions through the three versions at a settable speed, e.g., every two seconds. Each part of the user selection menu may include variable text portions, which automatically switch between the languages in the current (original or modified) set. In one embodiment, the text transitions as a scrolling marquee in which the text of one language may follow the text of the prior language in a horizontal fashion and be partially visible at the same time, depending on the number of characters set for the text display. In another embodiment, a fade transition may be used where the text in one language fades out and another appears. In another embodiment, the text may change vertically, with text in two languages being displayed one above the other at any given time. In another embodiment, a combination of these visual display methods may be employed.

A second method, selectable by the administrator by clicking on or otherwise actuating region 80 in FIG. 3, enables a user gesture, such as a swipe, on the copy or other actuable button on the LUI interface 84 (FIG. 4) to cause the text to change from one language to a next language. A further swipe by the user returns the text to the first language, if only two languages are available, or displays a third or subsequent language, and so on in sequence, if there are more than two languages in the set of languages. For example, an administrator selects the top three languages for the original set and the user can swipe or flick on an icon/button to change its language. For those strings that are not active buttons, a user pressing the string could choose or freeze that language for their current session.

Figure 5:
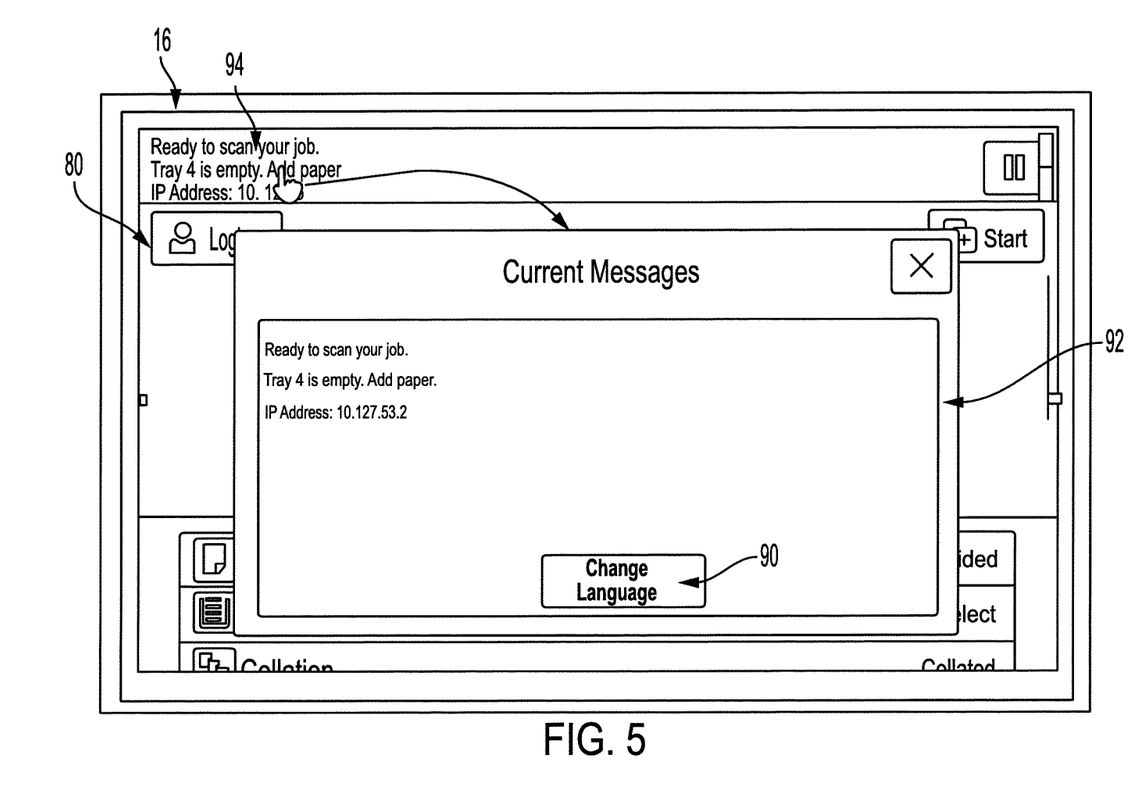
FIG. 5 illustrates a screenshot of a device local user interface, in accordance with another aspect of the exemplary embodiment.

A third method, selected by the administrator by clicking on or otherwise actuating region 82 in FIG. 3, enables a user of the LUI 16 to click on or otherwise actuate a "change language" button 90. A change language button 90 may be provided on other screens, as illustrated in FIG. 5, which shows a current message 92 being displayed when a user clicks on information 94 displayed on the screen. Having multiple ways of selecting a different language may be particularly useful for users that are able to navigate the commonly-used functions in the default language but need assistance with the messages or other less frequently viewed information. Depending upon screen space, the languages in the current set may all be displayed on the screen in the native wording so that a user can quickly find and activate one. For example, the change language button 90 could display "Change Language," "Sprache ändern," and "Changer de langue," contemporaneously or in a sequence.

Upon actuating the change language button 90, a menu of selectable supported languages may then be displayed for the user on the GUI 84 of the LUI 16, which may include the original language set selected by the administrator as well as one or more additional languages from the larger supported set. The GUI for language selection may be similar to that shown in FIG. 2, except that the user is not able to remove languages or change the priorities of the languages. As will be appreciated, the administrator may select to implement more than one of the language selection mechanisms. For example, when the first and third mechanisms are selected, the LUI GUI 84 may display the text 86 in the languages of the current set and also provide a change language button 90, which allows the user to see a menu of selectable languages and thereby chose a language which is not among the current set of languages. When the first and second mechanisms are selected, the text may scroll slowly between the languages, but the user is able to swipe the variable text 86 or associated button 88, e.g., in the same or a different direction to the scrolling direction, to speed up the scrolling or to go back more quickly to another selectable language. The administrator may select all the mechanisms 72, 74, 76. In other embodiments, one or more of the mechanisms may be provided by default.

In one embodiment, the user is able to select a language and perform an operation on the LUI with a same single click or other gesture (e.g., selection of the "copy" function and the language in which the LUI is presented by clicking on the copy button when its associated text is in English).

In one embodiment, a user may be permitted to select two or more languages in which text is subsequently displayed on the LUI.

In one embodiment, following a user language selection, text may be automatically displayed simultaneously on the LUI in the user-selected language and in one or more default languages, such as the highest priority language or the previously-displayed language.

In one embodiment, following a user language selection, all or at least a portion of the text is displayed in the selected language until the user's job (e.g., a print, copy, or fax job) has been executed on the associated device.

Figure 6:
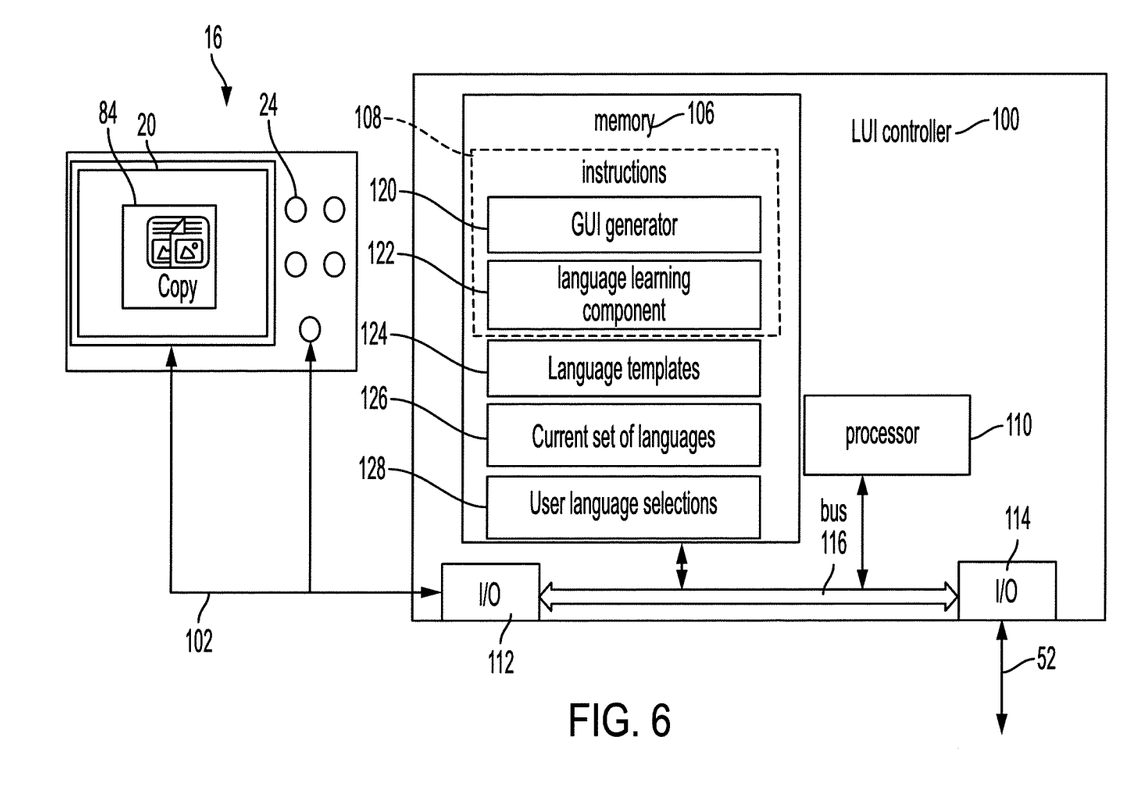
FIG. 6 is a functional block diagram of local user interface of the language selection system of FIG. 1, in accordance with one aspect of the exemplary embodiment.

As illustrated in FIG. 6, the LUI 16 includes an LUI controller 100, which is communicatively connected with the display device 20 and user input device 24, e.g., by wired or wireless links 102. The controller 100 includes memory 106, storing instructions 108 and a processor 110, in communication with the memory, which executes the instructions. One or more input/output devices 112, 114 allow the controller to communicate with external devices, such as the display device 20, user input device 24, and client computing device 14. Hardware components 106, 110, 112, 114 of the controller 100 may communicate via a data/control bus 116. In some embodiments, software components 60, 62 of the client computing device 14 may be incorporated in the controller 100, or vice versa.

The instructions 108 include a GUI generator 120 and a language learning component 122. The GUI generator 120 generates a GUI 84 on the LUI display 20, as discussed for FIGS. 4 and 5, for example. In generating the GUI, the GUI generator 120 may utilize one or more of a set of language templates 124 for displaying textual information in selected languages. Each supported language may thus be associated, in memory of the device 10, 12, with a set of templates allowing commands and other information to be displayed in that language, as well as variable portions 86 of each menu which are displayable in multiple languages.

The learning component 124 learns a modified set 126 of languages to be used in generating the variable portions 86 of the GUI 84 for the respective device. Starting with the original set 28, 30 of languages selected by the administrator, or otherwise, the learning component 124 stores a record 128 of which languages are selected by the users of the device 10 and, depending on one or more addition criteria, may add them to the original set, if they are not already present in the original set. For example, the addition criteria may specify that before a language is added to form a modified set of languages, it must have been selected at or above a threshold number or proportion of times in a preceding time period, such as the preceding day or week and/or have been selected at or above the number or proportion of times that at least one of the current languages in the original set has been selected. In this way, only languages whose selections are made consistently may be added to the set of languages. Languages in a current set that are not frequently selected by users may be removed from the current set 126 depending on one or more removal criteria. For example, the removal criteria may specify that before a language is removed, it must have been selected at or below a threshold number or proportion of times in a preceding time period, such as the preceding day or week and/or have been selected below the number or proportion of times that the other current languages in the set of languages have been selected. The number of languages in the current set 126 may be fixed or limited to a maximum number. Then, in order to add a language, one of the current languages with a lower usage (number or proportion of times selected) is removed, if needed, to maintain the maximum number of languages. For example, if the maximum number of languages is three and there are three languages in the current language set 126, a new language is only added to the set if there is a language in the set having a lower usage (e.g., based on number and/or proportion of selections in the preceding time period) which can be removed.

In the exemplary embodiment, the user selections of languages on the first device 10 are not used to learn the modified set of languages for the second device 12, and vice versa. The modified set of languages for a given device 10 is thus learnt based on user selections only for that device. The modified sets of languages thus adapt independently to the languages preferred by users of the respective device. This assumes that the group of users of each device is not exactly the same group of users.

In addition to, or as an alternative to, modifying the set of languages 126, the priority given to languages in the current set may be modified, based on usage. Languages that are most frequently selected by users of the device 10, in a given time period, may be made more prominent. Languages that are less frequently selected by users of the device 10 may be made less prominent. For example, the priority of languages initially selected by the administrator, or at a previous time, may be modified, based on the frequency with which each language is selected. In this way, the current, modified set of languages 126 and/or the respective priorities of the languages in the set, may change over time, e.g., as users with different language preferences make use of the device 10. The highest priority language in the current set may be used to select the language template used for generating the GUI 84 when a current user has not made a different language selection. For example, if the highest priority language is English, the English template(s) is are used until a user selects another language, such as French. The GUI 84 will continue to display text in French until the controller 100 determines that the current user has finished using the device, for example, when there has been no user interaction with the LUI 16 for a predetermined time period. The LUI then reverts to using the template(s) for the highest priority language, English in this case, while allowing the variable portions 86 to change languages from one to another of the current set 126, assuming that this mechanism has been enabled.

In addition to, or as an alternative to, using the highest priority language templates 124 unless a different language is selected by a user, the order in which languages are scrolled in the variable text portions 86 may be determined by the language priorities. For example, the highest priority language is displayed first, then the second priority language, and so on until the lowest priority language is displayed. In this way, parts or all of the text change from one of the current languages in the set to the next every few seconds.

In one embodiment, in addition to monitoring for changes in the system administrator's selections of languages and/or for frequently chosen languages, and making priority decisions based on these, the system may analyze the documents being printed, scanned or otherwise handled at that time to determine the language of the document. Methods exist for predicting the language of a document based on text analysis. The detected document language may be displayed, used to prioritize the language(s) shown, or provided to the administrator as a candidate language for selection. The user may change the language selected, to assist users that are printing documents which are not in their first language. For example, for a device configured to show two languages at once, given a French language document to be printed, the system may include French among the displayed languages and/or automatically change the language of the display to French. The selection of French may continue while printing the document, if any messages require attention, and then persist until the next job or next user interaction shifts the priorities, unless a user actively changes the language selection before then.

In some embodiments, a system administrator may be permitted to maintain one or more of the original languages in the current set so that it remains in the set of languages 126, even when it is selected rarely by users of the device. This may be useful in institutions which are required to provide certain language(s) for users, even if they are not commonly used.

The client computing device 14 may include one or more computing devices, such as a PC, such as a desktop, a laptop, palmtop computer, portable digital assistant (PDA), server computer, cellular telephone, tablet computer, pager, combination thereof, or other computing device capable of executing instructions for performing at least a part of the exemplary method. The LUI controller 100 may be a separate computing device in each device 10, 12 or incorporated in a digital front end of the respective device which controls other functions of the device, such as one or more of printing, copying, and scanning, etc., in the case of a multi-function printer.

The memory 38, 106 may represent any type of non-transitory computer readable medium such as random-access memory (RAM), read only memory (ROM), magnetic disk or tape, optical disk, flash memory, or holographic memory. In one embodiment, each memory 38, 106 comprises a combination of random-access memory and read only memory.

The I/O interfaces 44, 46, 112, 114 allow the respective computing device 14, 100 to communicate with other devices via a cable or computer network, such as a local area network (LAN) or wide area network (WAN), or the Internet, and may comprise a modulator/demodulator (MODEM) a router, a cable, and/or Ethernet port.

Each digital processor device 42, 110 can be variously embodied, such as by a single-core processor, a dual-core processor (or more generally by a multiple-core processor), a digital processor and cooperating math coprocessor, a digital controller, or the like. The digital processor 42, 110, in addition to executing instructions 40, 108 may also control the operation of the computer 14, 100.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or the like, and is also intended to encompass so-called "firmware" that is software stored on a ROM or the like. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

Figure 7:
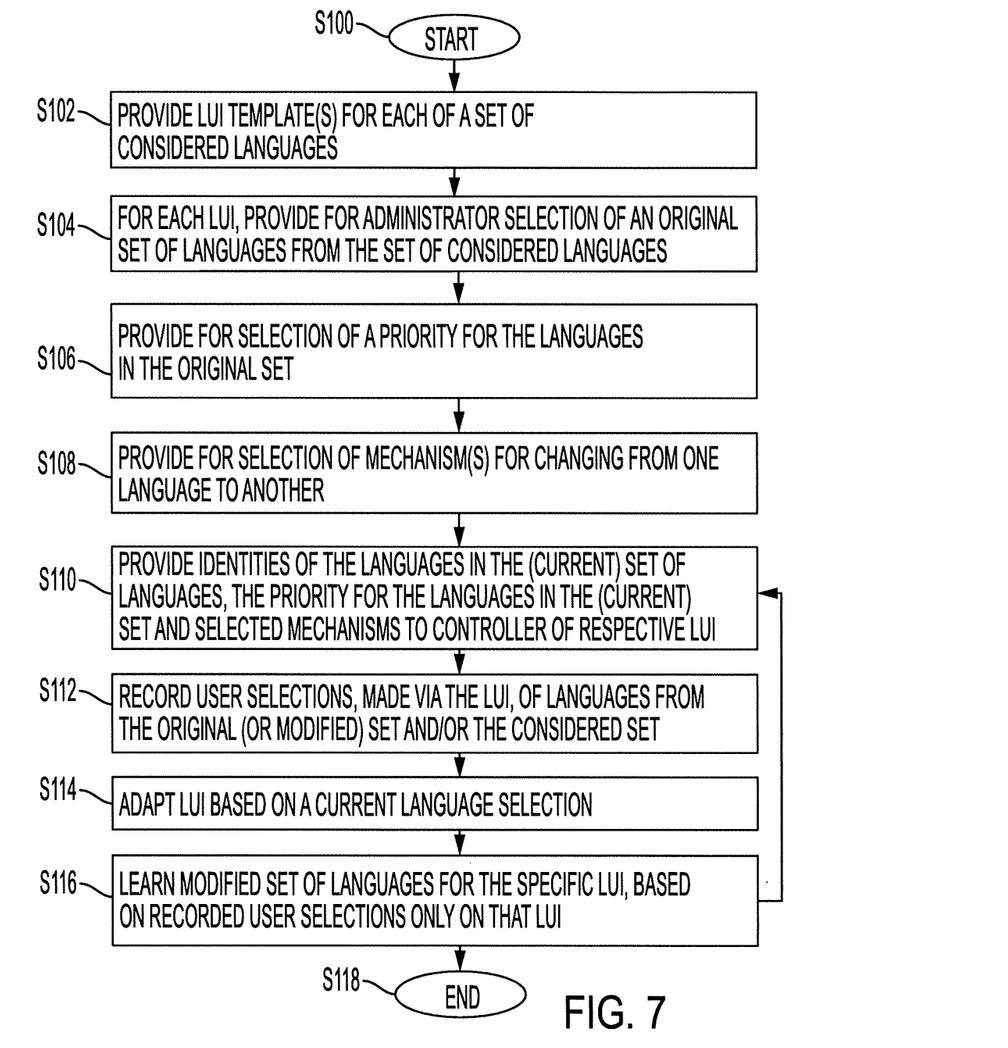
FIG. 7 illustrates a method for language selection, in accordance with another aspect of the exemplary embodiment.

FIG. 7 illustrates a language selection method which may be performed with the system 1 of FIG. 1. The method begins at S100.

At S102, templates 124 is/are provided for each of a set of supported languages.

At S104, when the language feature is enabled, provision is made for administrator selection of an original set of languages 28, 30 from the set of supported languages for one or more LUIs 16, 18, e.g., as an ordered list. The original set of languages is generally only a subset (fewer than all) of the many supported languages the product supports. One or more of the original set of languages may be selected automatically. For example, when the LUI is to be used in Germany, the highest priority language may be automatically set to German.

In other embodiments, the original set of languages 28, 30 may be determined automatically, e.g., based on the location of the device 10. In other embodiments, the original set 28, 30 may include all the supported languages for which templates are available, and is progressively modified through the learning step, described at S116, below.

At S106, provision is made for selection of a priority for the languages in the original set of languages 28, 30, which may be used to determine the order in which languages are switched. In some embodiments the administrator is provided with an opportunity to select a plurality of high priority languages, which will feature in the switching mechanism 72 and/or 74, and one or more low priority languages, which can be selected by users, but as they are low priority, they do not automatically switch. In other embodiments, the priory of the languages is automatically set and may be refined in the learning step, described at S116, below.

At S108, provision is made for administrator selection of one or more mechanisms for changing from one language to another of the supported languages on the LUI 16, 18. In other embodiments, the mechanism(s) may be automatically selected/provided.

At S110, the identities of the languages in the original set of languages, the priority for the languages in the original set 28, 30, and selected mechanisms are provided to the respective LUI 16, 18.

At S110, a graphical user interface 84 is generated for the LUI 16, 18, based on the identities of the languages in the original set of languages 28, 30, the priority for the languages in the original set, and selected mechanisms.

Depending on which of the mechanisms are provided for changing the language:

1. A user may hover over, or swipe on, the variable text or associated selection button, causing the text to slowly roll over showing the text in the supported languages.

2. The text may automatically rotate round displaying the text in different languages.

3. A user may click on the variable text, causing a language select menu to be displayed allowing a user to select a language from the original/current set or the entire supported set. Information in the current screen is then "translated" into the selected language, e.g., through use of the appropriate language template, or in some cases, by accessing a machine translation system.

4. If multiple languages have been added to the current set, then multiple presses of a language selection button could enable the user to toggle through the languages, in the order that they have been stored in the sequence.

At S112, user selections 128, via the LUI 16, 18, of languages from the original/current set and/or the supported set are recorded. It may be assumed that if a user has not actively selected a language, then the highest priority language is the user's selection.

At S114, the GUI is adapted, with the appropriate language template, to the user's language selection.

At S116, the recorded user selections of languages over a period of time are used to learn a modified set of languages 126, which may be different from the prior (original or a modified) set. A priority of the languages in the modified set may also be learnt.

The method may return to S110 for updating the GUI based on the current set of languages and also to S112 for subsequently recording and learning a further modified set of languages. In some embodiments, the languages added in the learning step may be retained in the current set for a predetermined amount of time (such as 1 month). After that time, they may be automatically dropped.

The method ends at S118.

The method illustrated in FIG. 7 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use. The computer program product may be integral with the computer 14, 100 (for example, an internal hard drive of RAM), or may be separate (for example, an external hard drive operatively connected with the computer 14, 100), or may be separate and accessed via a digital data network such as a local area network (LAN) or the Internet (for example, as a redundant array of inexpensive or independent disks (RAID) or other network server storage that is indirectly accessed by the computer 14, 100, via a digital network).

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphics card CPU (GPU), or PAL, or the like. In general, any device, capable of implementing a finite state machine that is in turn capable of implementing the flowchart shown in FIG. 7, can be used to implement the language selection method. As will be appreciated, while the steps of the method may all be computer implemented, in some embodiments one or more of the steps may be at least partially performed manually. As will also be appreciated, the steps of the method need not all proceed in the order illustrated and fewer, more, or different steps may be performed.

While reference is made herein to printers as share devices 10, 12, the system and method may find application in other devices with a user interface that is shared by several users (different users on same interface rather than on separate user interfaces, such as their phone or computer). Examples of such devices include devices in airplanes, elevators, lifts, medical equipment, kiosks including maps, heavy equipment, HVAC controls, advertising displays including electronic price signs, and car displays (e.g., in rental cars).

The system and method find use in environments where users have different first languages, for example in an embassy or in countries such as Canada or Switzerland which have more than one official language.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for language selection on a shared local user interface, comprising:
    providing at least one mechanism on a shared local user interface for selection, by each of a group of multiple users of the shared local interface, of one of an original set of at least two languages for text to be displayed on the local user interface;
    at a plurality of times, receiving a user's selection, by a respective one of the group of multiple users, of one of the original set of languages; and
    based on a plurality of the user selections by users in the group of multiple users, learning a modified set of languages to be used in place of the original set of languages during providing the at least one mechanism on the shared local user interface, at a subsequent time, for selection, by each of the group of multiple users, of one of the modified set of languages,
    wherein the providing at least one mechanism and the learning of the modified set of languages are performed with a processor.

2. The method of claim 1, wherein the modified set of languages comprises at least two natural languages.

3. The method of claim 1, wherein the at least one mechanism comprises a plurality of mechanisms.

4. The method of claim 1, wherein the at least one mechanism comprises automatically displaying text in each of the languages in the set in a sequence on the local user interface and providing for a user to select a currently displayed one of the languages.

5. The method of claim 1, wherein the at least one mechanism comprises providing for a user to perform a gestured recognized by the user interface as an instruction to change text in a first of the languages in the set to text in a second of the languages in the set on the local user interface.

6. The method of claim 1, wherein the at least one mechanism comprises a menu of languages which is displayed to the user when requested by the user.

7. The method of claim 1, wherein the at least one mechanism enables a user to select a language which is not among the languages in a current set of languages, the current set being the original set of languages or a modified set of languages.

8. The method of claim 1, wherein the modified set of languages includes at least one language which is not in the original set of languages and/or contains fewer languages than the original set of languages.

9. The method of claim 1, wherein the local user interface enables a user to control an associated device.

10. The method of claim 1, further comprising providing for an authorized user to select the original set of languages.

11. The method of claim 10, further comprising providing for an authorized user to select a priority for a language in the original set of at least two languages, the priority being used to set a default one of the original set of languages for the user interface.

12. The method of claim 1, wherein the learning further comprises learning a priority for at least one of the languages in the modified set, based on the received plurality of user selections.

13. A system comprising memory which stores instructions for performing the method of claim 1 and a processor, in communication with the memory, which executes the instructions.

14. A computer program product comprising a non-transitory recording medium storing instructions, which when executed on a computer, causes the computer to perform the method of claim 1.

15. The method of claim 1, wherein the modified set includes at least two languages.

16. A shared local user interface, comprising:
    memory storing instructions which:
        provide at least one mechanism on the shared local user interface for selection, by each of a group of multiple users of the shared local interface, of one of an original set of at least two languages for text to be displayed on the local user interface,
        at a plurality of times, receive a user's selection of one of the original set of languages by a respective one of the group of multiple users, and
        based on a plurality of the users' selections, learn a modified set of languages to be used in place of the original set of languages during providing the at least one mechanism on the shared local user interface, at a subsequent time, for selection, by one of the group of multiple users, of one of the modified set of languages; and
    a processor which executes the instructions.

17. In combination, the local user interface of claim 16 and a device which is at least partially controlled by the local user interface.

18. A method for language selection on a shared local user interface, comprising:
    providing at least one mechanism on a shared local user interface for selection of one of an original set of at least two languages for text to be displayed on the local user interface, the at least one mechanism comprising:
        automatically displaying text in each of the languages in the set in a sequence on the local user interface, text in a current screen automatically transitioning between the languages, and providing for a user to select a currently displayed one of the languages while the associated text is being displayed in a given one of the languages;

receiving a user's selection of one of the original set of languages; and displaying text on the LUI in the selected language;

wherein the providing at least one mechanism and the displaying of text on the LUI in the selected language are performed with a processor.

19. The method of claim 18, wherein the sequence is based on a preset priority for at least one of the languages in the set.

20. The method of claim 18, further comprising, based on a plurality of user selections, learning a modified set of languages to be used in place of the original set of languages during providing the at least one mechanism at a subsequent time.

\* \* \* \* \*